(12) United States Patent
Vemireddy et al.

(10) Patent No.: US 12,314,352 B2
(45) Date of Patent: May 27, 2025

(54) USING MACHINE LEARNING FOR COLLISION DETECTION TO PREVENT UNAUTHORIZED ACCESS

(71) Applicant: Bank of America Corporation, Charlotte, NC (US)

(72) Inventors: Vijaya L. Vemireddy, Plano, TX (US); Mark Odiorne, Waxhaw, NC (US); David Smiddy, Chadds Ford, PA (US)

(73) Assignee: Bank of America Corporation, Charlotte, NC (US)

( * ) Notice: Subject to any disclaimer, the term of this patent is extended or adjusted under 35 U.S.C. 154(b) by 162 days.

(21) Appl. No.: 18/212,859

(22) Filed: Jun. 22, 2023

(65) Prior Publication Data

US 2024/0427856 A1 Dec. 26, 2024

(51) Int. Cl.
*G06F 21/30* (2013.01)

(52) U.S. Cl.
CPC .................................. *G06F 21/30* (2013.01)

(58) Field of Classification Search
CPC ... G06F 21/31; H04L 63/0861; H04L 63/083; H04L 63/0884
USPC .......................................................... 726/2
See application file for complete search history.

(56) References Cited

U.S. PATENT DOCUMENTS

| 10,693,872 | B1 * | 6/2020 | Larson ................. H04L 9/3231 |
| 11,593,639 | B1 | 2/2023 | Garg et al. |
| 11,636,125 | B1 | 4/2023 | Carmona Perez et al. |
| 11,675,799 | B2 | 6/2023 | Pierri et al. |
| 11,683,246 | B2 | 6/2023 | Agrawal et al. |
| 11,869,006 | B1 * | 1/2024 | Rahimi ............... G06Q 30/0185 |
| 2018/0052981 | A1 * | 2/2018 | Nygate .................... G06N 20/00 |
| 2020/0366671 | A1 * | 11/2020 | Larson .................... G06F 9/451 |
| 2021/0099431 | A1 * | 4/2021 | Wasicek ............. G06F 21/6263 |
| 2021/0312307 | A1 * | 10/2021 | Hazard .................. G06N 20/00 |
| 2022/0374105 | A1 * | 11/2022 | Seth ..................... G06F 3/04842 |
| 2023/0054186 | A1 | 2/2023 | Messous |
| 2023/0055581 | A1 | 2/2023 | Bidstrup et al. |
| 2023/0063601 | A1 | 3/2023 | Upadhyay et al. |
| 2023/0068908 | A1 | 3/2023 | Guo et al. |
| 2023/0069960 | A1 | 3/2023 | Mahadevan et al. |
| 2023/0085991 | A1 | 3/2023 | Liebman |
| 2023/0090743 | A1 | 3/2023 | Pinto et al. |
| 2023/0091638 | A1 | 3/2023 | Medithe et al. |

(Continued)

*Primary Examiner* — Teshome Hailu
(74) *Attorney, Agent, or Firm* — Banner & Witcoff, Ltd.

(57) ABSTRACT

A computing platform may train a synthetic identity detection model to detect synthetic identity information. The computing platform may receive identity information corresponding to an identity generation request. The computing platform may input, into the synthetic identity detection model, the identity information, which may cause the synthetic identity detection model to: identify at least one collision between the received identity information and stored identity information, and generate, based on the at least one collision, a synthetic identity score indicating a likelihood that the received identity information corresponds to a request to generate a synthetic identity. The computing platform may compare the synthetic identity score to at least one synthetic identity detection threshold. Based on identifying that the synthetic identity score meets or exceeds the at least one synthetic identity detection threshold, the computing platform may execute one or more security actions.

18 Claims, 8 Drawing Sheets

(56) References Cited

U.S. PATENT DOCUMENTS

| | | |
|---|---|---|
| 2023/0113462 A1 | 4/2023 | Sesha et al. |
| 2023/0124166 A1 | 4/2023 | Mohanty et al. |
| 2023/0126849 A1 | 4/2023 | de Grimaudet de Rochebouët et al. |
| 2023/0132720 A1 | 5/2023 | Khmaissia et al. |
| 2023/0136356 A1 | 5/2023 | Foukas et al. |
| 2023/0147685 A1 | 5/2023 | Koch et al. |
| 2023/0177798 A1 | 6/2023 | Griffin |
| 2023/0188500 A1 | 6/2023 | Pikarski |

\* cited by examiner

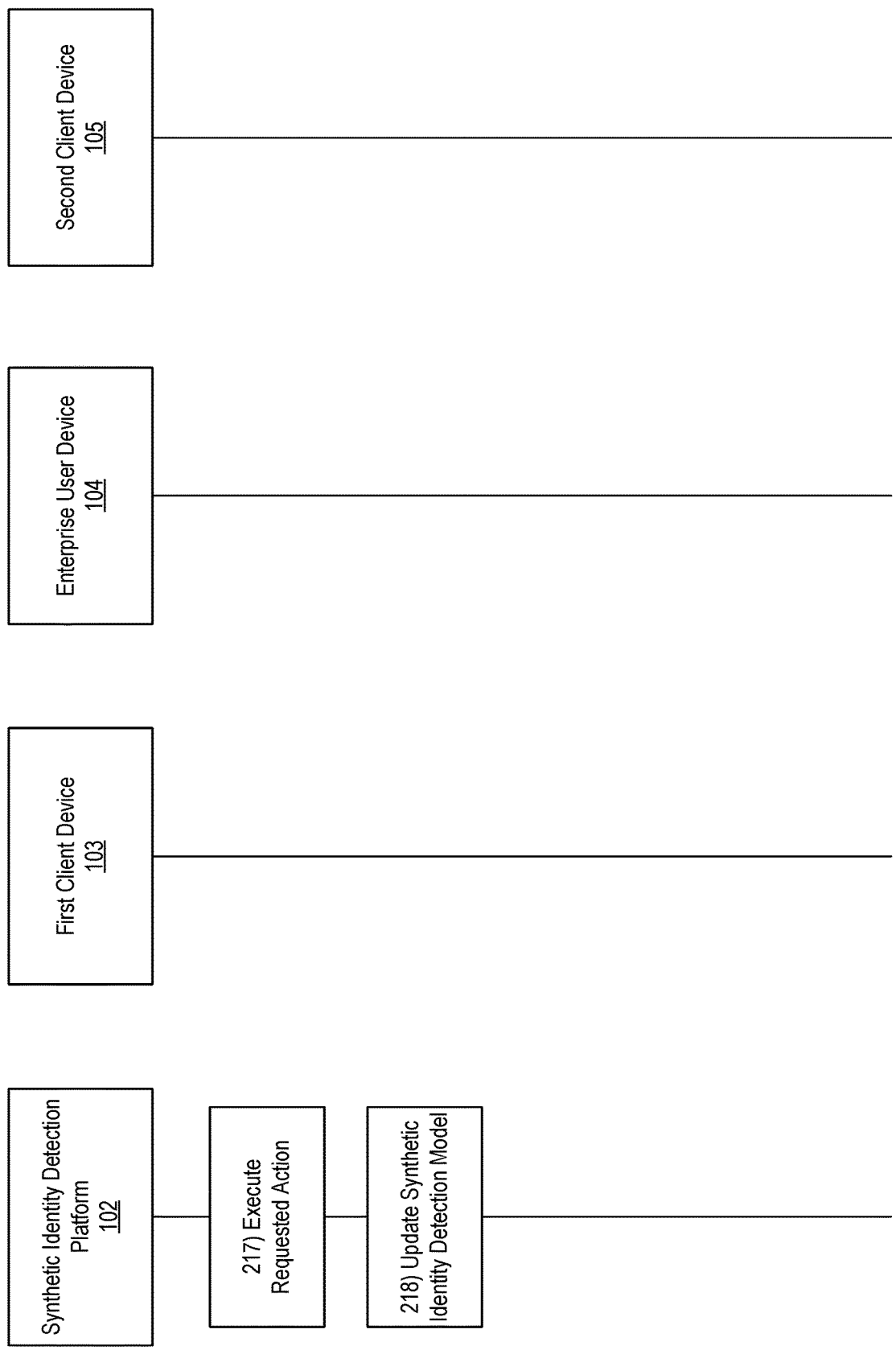

USING MACHINE LEARNING FOR COLLISION DETECTION TO PREVENT UNAUTHORIZED ACCESS

BACKGROUND

In some instances, malicious actors may attempt to create a synthetic identity using information corresponding to one or more valid users. In some instances, stored and/or otherwise accessible information may correspond to the one or more valid users. In some instances, however, such information might not be fully leveraged in synthetic identity detection. Accordingly, there may be limits on how effective and/or accurate current synthetic identity detection methods may be. It may thus be important to improve the quality of synthetic identity detection models to improve their detection capabilities.

SUMMARY

Aspects of the disclosure provide effective, efficient, scalable, and convenient technical solutions that address and overcome the technical problems associated with synthetic identity detection. In accordance with one or more embodiments of the disclosure, a computing platform comprising at least one processor, a communication interface, and memory storing computer-readable instructions may train a synthetic identity detection model, which may configure the synthetic identity detection model to detect synthetic identity information. The computing platform may receive identity information corresponding to an identity generation request. The computing platform may input, into the synthetic identity detection model, the identity information, which may cause the synthetic identity detection model to: identify at least one collision between the received identity information and stored identity information, and generate, based on the at least one collision, a synthetic identity score indicating a likelihood that the received identity information corresponds to a request to generate a synthetic identity. The computing platform may compare the synthetic identity score to at least one synthetic identity detection threshold. Based on identifying that the synthetic identity score meets or exceeds the at least one synthetic identity detection threshold, the computing platform may execute one or more security actions.

In one or more examples, training the synthetic identity detection model may include training the synthetic identity detection model to identify a likelihood that a given discrepancy between received and expected identity information corresponds to a synthetic identity generation attempt by generating correlations between historical discrepancies in particular types of identity information and labeling them based on their association with a legitimate or synthetic identity. In one or more examples, training the synthetic identity detection model may include applying a higher weight to immutable identity information and a lower weight to mutable identity information.

In one or more instances, the identity information may include one or more of: address information, biometric information, social security numbers, account information, address information, social media information, or contact information. In one or more instances, identifying the at least one collision may include detecting that at least a portion of the identity information is already stored in association with a different identity.

In one or more examples, the different identity may be one of: a legitimate identity or a synthetic identity. In one or more examples, the at least one synthetic identity detection threshold may be specific to a legitimate user associated with the identity information.

In one or more instances, based on detecting that the synthetic identity score does not meet or exceed the at least one synthetic identity detection threshold, the computing platform may process the identity generation request. In one or more instances, based on detecting that the synthetic identity score meets or exceeds a first synthetic identity detection threshold of the at least one synthetic identity detection threshold, the computing platform may send, to a client device with a known association to a legitimate user corresponding to the identity information, a prompt for identity confirmation information. The computing platform may receive the identity confirmation information. The computing platform may update, using the synthetic identity detection model and based on the identity confirmation information, the synthetic identity score.

In one or more examples, the identity confirmation information may be biometric information for the legitimate user. In one or more examples, based on detecting that the synthetic identity score meets or exceeds a second synthetic identity detection threshold of the at least one synthetic identity detection thresholds, the computing platform may perform one or more of: denying the identity generation request, sending synthetic identity notifications to a legitimate user corresponding to the identity information and an administrator corresponding to the computing platform, and initiating an investigation into the identity generation request and associated identity generation requests. In one or more instances, the computing platform may update, based on the identity information, the synthetic identity score, and the synthetic identity detection threshold comparison, the synthetic identity detection model.

BRIEF DESCRIPTION OF DRAWINGS

The present disclosure is illustrated by way of example and is not limited in the accompanying figures in which like reference numerals indicate similar elements and in which:

FIGS. 2A-2D depict an illustrative event sequence for using machine learning for collision detection to prevent synthetic identities in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to using the identification of data collisions to prevent the generation of synthetic identities, as is described further below. In some instances, an enterprise organization may maintain data about users/clients of the organization. As new information is received, it may be compared with existing information to identify collisions (e.g., a social security number that is associated with one user but is being used to open an account for a different user, or the like). If there is a collision with a data point (e.g., address, social security number, phone number, or the like), it may be flagged for further investigation. In some examples, a scoring arrangement may be used to score collisions. As the score increases, investigators may take a deeper dive into the data, request, or the like. For instances, the account opening request may be blocked entirely. In another example, the account opening may be permitted, but the availability of funds or transaction types available may be limited until the account/user is vetted (e.g., no withdrawals until the account is vetted). A machine learning model may be used to evaluate users/requests when flagged for investigation to identify patterns of misuse. A white box model may be used to enable fraud analysts to continuously monitor not just outputs (e.g., score, pattern recognition, or the like), but also additional information related to why the output was generated by the model. These and other features are described in greater details below.

Figure 1A:
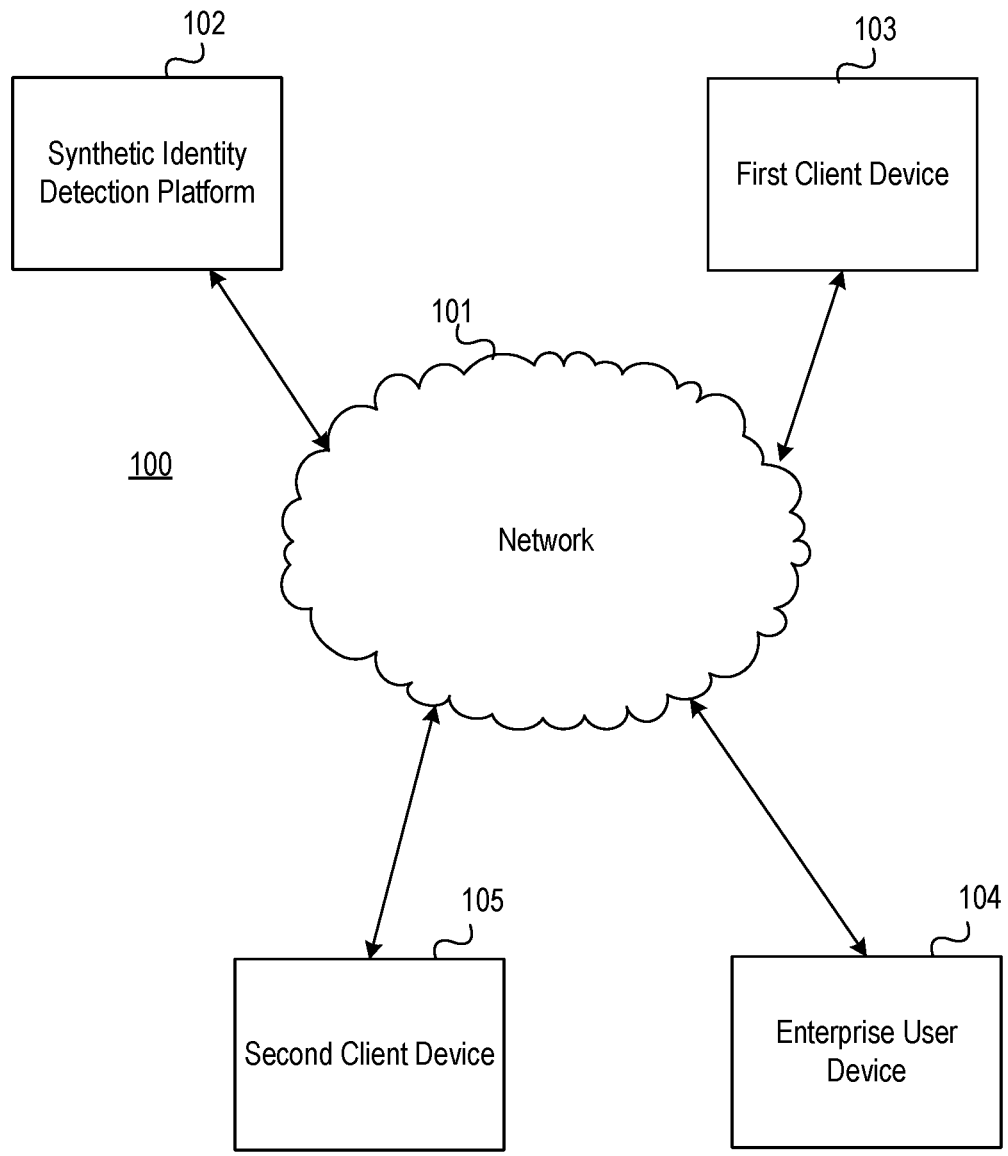
FIGS. 1A and 1B depict an illustrative computing environment for using machine learning for collision detection to prevent synthetic identities in accordance with one or more example embodiments.
Figure 1B:
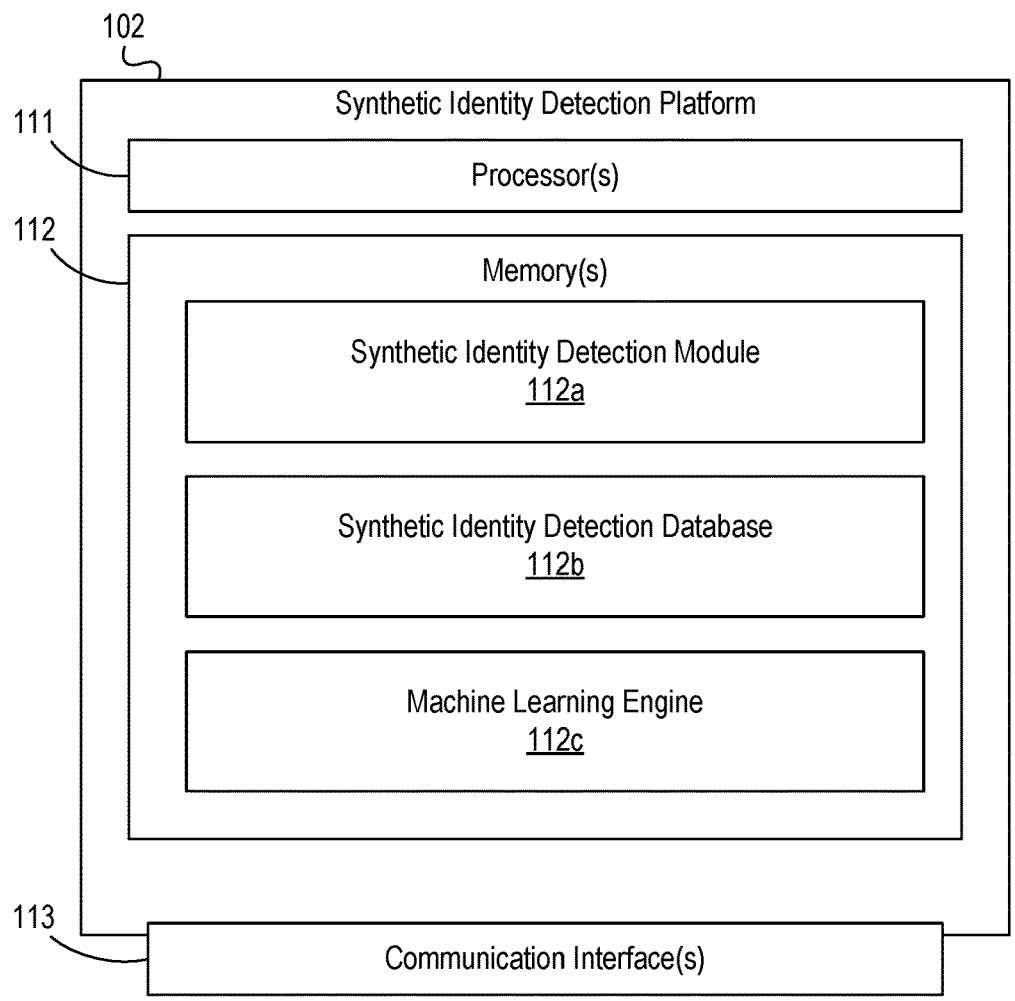

FIGS. 1A-1B depict an illustrative computing environment for using unsupervised learning to detect synthetic identity generation attempts in accordance with one or more example embodiments. Referring to FIG. 1A, computing environment 100 may include one or more computer systems. For example, computing environment 100 may include a synthetic identity detection platform 102, a first client device 103, enterprise user device 104, and second client device 105.

Synthetic identity detection platform 102 may include one or more computing devices and/or other computer components (e.g., processors, memories, communication interfaces, or the like). For example, the synthetic identity detection platform 102 may be configured to generate, update, and/or otherwise maintain a synthetic identity detection model. In some instances, the synthetic identity detection model may be configured to identity data collisions, score the likelihood of a synthetic identity request based on any identified data collisions, and trigger security actions accordingly.

First client device 103 may be or include one or more devices (e.g., laptop computers, desktop computer, smartphones, tablets, and/or other devices) configured for use in providing identity information for identity generation (e.g., account generation, profile generation, or the like). In some instances, this may correspond to a legitimate identity generation (e.g., by a valid user) or a synthetic identity generation (e.g., a fraudulent attempt to misuse or misappropriate an identity and/or pieces of personal identifiable information of a valid user). In some instances, the first client device 103 may be configured to display graphical user interfaces (e.g., information entry interfaces, identity generation interfaces, or the like). Any number of such user devices may be used to implement the techniques described herein without departing from the scope of the disclosure.

Enterprise user device 104 may be or include one or more devices (e.g., laptop computers, desktop computer, smartphones, tablets, and/or other devices) configured for use in providing identity protection services. For example, the enterprise user device 104 may be used by an employee of an organization (e.g., such as an organization corresponding to the synthetic identity detection platform 102). In some instances, the enterprise user device 104 may be configured to display graphical user interfaces (e.g., synthetic identity detection interfaces, or the like). Any number of such user devices may be used to implement the techniques described herein without departing from the scope of the disclosure.

Second client device 105 may be or include one or more devices (e.g., laptop computers, desktop computer, smartphones, tablets, and/or other devices) configured for use in providing identity information for identity confirmation (e.g., confirmation of identity information provided to establish an account and/or otherwise make a request on behalf of a user of the second client device 105, or the like). In some instances, the second client device 105 may be configured to display graphical user interfaces (e.g., identity confirmation interfaces, or the like). Any number of such user devices may be used to implement the techniques described herein without departing from the scope of the disclosure.

Computing environment 100 also may include one or more networks, which may interconnect synthetic identity detection platform 102, first client device 103, enterprise user device 104, and second client device 105. For example, computing environment 100 may include a network 101 (which may interconnect, e.g., synthetic identity detection platform 102, first client device 103, enterprise user device 104, and second client device 105).

In one or more arrangements, synthetic identity detection platform 102, first client device 103, enterprise user device 104, and second client device 105 may be any type of computing device capable of receiving a user interface, receiving input via the user interface, and communicating the received input to one or more other computing devices. For example, synthetic identity detection platform 102, first client device 103, enterprise user device 104, second client device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of synthetic identity detection platform 102, first client device 103, enterprise user device 104, and second client device 105 may, in some instances, be special-purpose computing devices configured to perform specific functions.

Referring to FIG. 1B, synthetic identity detection platform 102 may include one or more processors 111, memory 112, and communication interface 113. A data bus may interconnect processor 111, memory 112, and communication interface 113. Communication interface 113 may be a network interface configured to support communication between synthetic identity detection platform 102 and one or more networks (e.g., network 101, or the like). Memory 112 may include one or more program modules having instructions that when executed by processor 111 cause synthetic identity detection platform 102 to perform one or more functions described herein and/or one or more databases that may store and/or otherwise maintain information which may be used by such program modules and/or processor 111. In some instances, the one or more program modules and/or databases may be stored by and/or maintained in different memory units of synthetic identity detection platform 102 and/or by different computing devices that may form and/or otherwise make up synthetic identity detection platform 102.

For example, memory 112 may have, host, store, and/or include synthetic identity detection module 112a, synthetic identity detection database 112b, and machine learning engine 112c. Synthetic identity detection module 112a may have instructions that direct and/or cause synthetic identity detection platform 102 to execute advanced optimization techniques to detect information collisions for synthetic identity detection. Synthetic identity detection database 112b may store information used by synthetic identity detection module 112a, in performing the collision detection for synthetic identity detection and/or in performing other functions. Machine learning engine 112c may be used to train, deploy, and/or otherwise refine models used to support functionality of the synthetic identity detection module 112a through both initial training and one or more dynamic feedback loops, which may, e.g., enable continuous improvement of the synthetic identity detection platform 102 and further optimize the identification and prevention of attempts to generate synthetic identities.

Figure 2A:
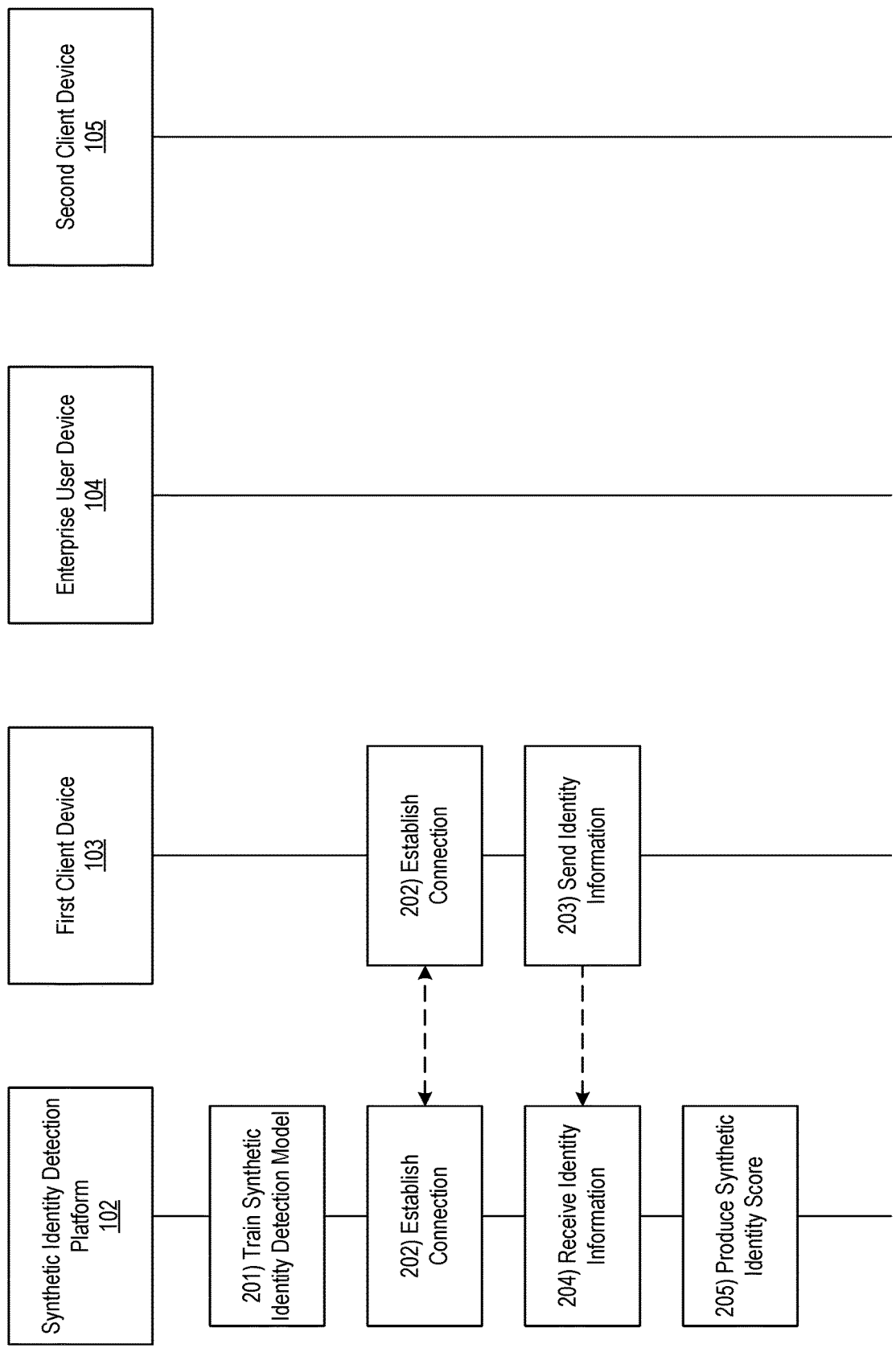

FIGS. 2A-2D depict an illustrative event sequence for using machine learning for collision detection to prevent synthetic identities in accordance with one or more example embodiments. Referring to FIG. 2A, at step 201, the synthetic identity detection platform 102 may train a synthetic identity detection model. For example, the synthetic identity detection platform 102 may receive historical user identity information (e.g., social security number, income, account information, demographic information, address information, employment information, contact information, and/or other information that may correspond to an identity of a given user). The synthetic identity detection platform 102 may further receive, for the various types of historical user identity information, significance information, which may, e.g., represent how significant a collision (e.g., an identification that a piece of identity information is duplicated within internal data, external data, or the like) for the corresponding type of information may be, how significant a variation in the information may be, and/or other information. As a particular example, the synthetic identity detection platform 102 may assign significance information indicating a higher level of significance for immutable identity information (e.g., name, biometrics information, social security number, phone number, or the like) when compared against identity information that may be more susceptible to change (e.g., address, place of business, or the like).

In some instances, the synthetic identity detection platform 102 may train the synthetic identity detection model based on the historical user identity information and the significance information, which may, e.g., enable the synthetic identity detection model to identify a synthetic identity detection score based on the input of given user identity information. For example, based on the historical user identity information and the significance information, the synthetic identity detection model may assign synthetic identity detection scores for various requests corresponding to the historical user identity information, which may, e.g., cause the synthetic identity detection model to establish stored correlations between such information and the corresponding synthetic identity detection scores. Based on these correlations, the synthetic identity detection model may be trained to output synthetic identity detection scores based on incoming user identity information.

In some instances, the synthetic identity detection platform 102 may also train the synthetic identity detection model based on a scoring matrix, which may, e.g., correlate synthetic identity detection scores with corresponding actions to be performed in the event that such a score is detected. For example, the synthetic identity detection platform 102 may train the synthetic identity detection model to perform a first action if the synthetic identity detection score is within a first range, a second action if the synthetic identity detection score is within a second range, etc.

In some instances, in training the synthetic identity detection model, the synthetic identity detection platform 102 may use one or more supervised learning techniques (e.g., decision trees, bagging, boosting, random forest, k-NN, linear regression, artificial neural networks, support vector machines, and/or other supervised learning techniques), unsupervised learning techniques (e.g., classification, regression, clustering, anomaly detection, artificial neutral networks, and/or other unsupervised models/techniques), and/or other techniques.

In some instances, the synthetic identity detection platform 102 may train the synthetic identity detection model based on internal data (e.g., account information, profile information, or the like) and/or external data (e.g., open source data, social media data, third party data, and/or other information).

At step 202, the first client device 103 may establish a connection with the synthetic identity detection platform 102. For example, the first client device 103 may establish a first wireless data connection with the synthetic identity detection platform 102 to link the first client device 103 to the synthetic identity detection platform 102 (e.g., in preparation for sending identity information, identity generation requests, or the like). In some instances, the first client device 103 may identify whether or not a connection is already established with the synthetic identity detection platform 102. If a connection is already established with the synthetic identity detection platform 102, the first client device 103 might not re-establish the connection. If a connection is not yet established with the synthetic identity detection platform 102, the first client device 103 may establish the first wireless data connection as described herein.

At step 203, the first client device 103 may send identity information and/or an identity generation request (e.g., request to create a profile or account, request to purchase a financial product, or the like). For example, the first client device 103 may send social security numbers, income, account information, transaction information, demographic information, address information, employment information, contact information, social media information, and/or other information that may correspond to an identity of a given user. In some instances, the identity information may all correspond to a valid user who may be operating the first client device 103. In other instances, the identity information may correspond to one or more valid users, but these valid users may be different than a bad actor who may be operating the first client device 103 (e.g., attempting to generate a synthetic identify by impersonating the one or more valid users). In some instances, the first client device 103 may send the identity information to the synthetic identity detection platform 102 while the first wireless data connection is established.

At step 204, the synthetic identity detection platform 102 may receive the identity information (sent at step 203) from the first client device 103. For example, the synthetic identity detection platform 102 may receive the identity information via the communication interface 113 and while the first wireless data connection is established.

At step 205, the synthetic identity detection platform 102 may input the identity information into the synthetic identity detection model to identify a synthetic identity score. For example, the synthetic identity detection model may identify any data collisions between the identity information and the historical identity information. For example, the synthetic identity model may identify whether an address, place of business, name, biometric information, social security number phone number, and/or other information input into the model matches information accessible from an internal and/or external database. In doing so, the synthetic identity model may identify whether the identity information is being input as part of an attempt to generate a synthetic identity based on a valid user corresponding to a portion of the identity information. In some instances, the synthetic identity model may identify collisions between the identity information and one or more known users (e.g., a home address associated with a first known user and a phone number associated with a second known user).

Once one or more collisions have been identified, the synthetic identity detection model may score the collisions. For example, the synthetic identity detection model may first identify whether the collisions correspond to immutable data or mutable data, and may assign a significance value accordingly. In these instances, the synthetic identity detection model may assign a higher significance value (e.g., a value between 0.5 and 1, or the like) to the immutable data and a lower significance value (e.g., a value between 0 and 0.5, or the like) to the mutable data (e.g., as the expectation of change in mutable data may be more reasonable). In these instances, the synthetic identity detection model may identify an average value based on the significance values by identifying a total sum of the significance values associated with the colliding identity information, and dividing the sum by the number of collisions. In some instances, this average may correspond to the synthetic identity detection score.

In instances where the synthetic identity detection model detects collisions between more than a threshold amount of information types (e.g., more than 90% of the identity information collides with a particular user profile), the synthetic identity detection model may adjust the synthetic identity detections score based on the non-colliding information. For example, if everything other than a home address matches stored information for a given user, the user may simply have moved, and thus there might not be a synthetic identity generation attempt despite the number of collisions, and thus the synthetic identity detection model may reduce the synthetic identity detection score accordingly. In some instances, this analysis may be based on the historical identity information (e.g., frequently changing addresses for the user, a change in job, or the like) and/or user input information (e.g., a notification of a move, or the like), and may be specific to given users (e.g., a change in address for a first user may be anticipated whereas a change in address for a second user might not be anticipated).

Figure 2B:
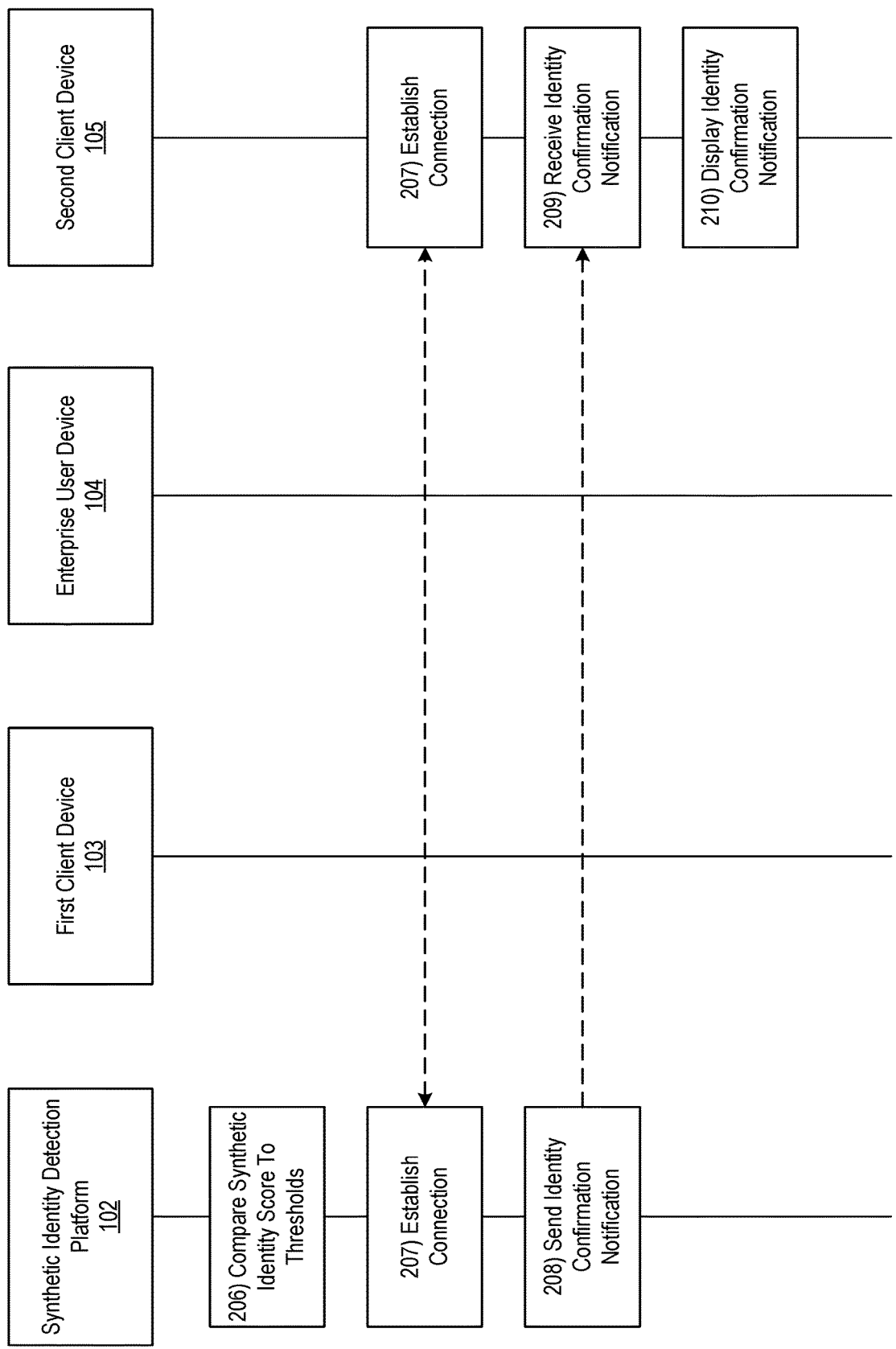

Referring to FIG. 2B, at step 206, the synthetic identity detection model may compare the synthetic identity detection score to one or more synthetic identity detection thresholds. In some instances, these synthetic identity detection thresholds may be user specific (e.g., based on user specified preferences, account information, and/or other identity information). For example, if the synthetic identity detection model identifies that the synthetic identity detection score does not meet or exceed a first threshold, the synthetic identity detection platform 102 may proceed to step 217. If the synthetic identity detection model identifies that the synthetic identity detection score does meet or exceed the first threshold, but not a second threshold (greater than the first threshold), the synthetic identity detection platform 102 may proceed to step 207. If the synthetic identity detection model identifies that the synthetic identity detection score meets or exceeds the second threshold, the synthetic identity detection platform 102 may proceed to step 213.

At step 207, the synthetic identity detection platform 102 may establish a connection with second client device 105. For example, the synthetic identity detection platform 102 may establish a second wireless data connection with the second client device 105 to link the synthetic identity detection platform 102 to the second client device 105 (e.g., in preparation for prompting for identity confirmation information). In these instances, the second client device 105 may be a user device known to be associated with a valid user corresponding to the identity information. In some instances, the synthetic identity detection platform 102 may identify whether or not a connection is already established with the second client device 105. For example, if the synthetic identity detection platform 102 identifies that a connection is already established with the second client device 105, the synthetic identity detection platform 102 might not re-establish the connection. Otherwise, if the synthetic identity detection platform 102 identifies that a connection is not yet established with the second client device 105, the synthetic identity detection platform 102 may establish the second wireless data connection as described herein.

At step 208, the synthetic identity detection platform 102 may send an identity confirmation information notification to the second client device 105. For example, the synthetic identity detection platform 102 may send the identity confirmation information notification to the second client device 105 via the communication interface 113 and while the second wireless data connection is established. In some instances, the synthetic identity detection platform 102 may also send one or more commands directing the second client device 105 to display the identity confirmation information notification.

At step 209, the second client device 105 may receive the identity confirmation information notification from the synthetic identity detection platform 102. For example, the second client device 105 may receive the identity confirmation information notification while the second wireless data connection is established. In some instances, the second client device 105 may also receive the one or more commands directing the second client device 105 to display the identity confirmation information notification.

At step 210, based on or in response to the one or more commands received at step 209, the second client device 105 may display the identity confirmation information notification. For example, the second client device 105 may display a graphical user interface similar to graphical user interface 400, which may prompt for identity confirmation information (e.g., biometric information (e.g., fingerprint, real time image/video, or the like) contact information, address information, account information, name information, and/or other information that may be used to confirm an identity). In some instances, the identity confirmation information notification may prompt for certain information based on features of the second client device 105 (e.g., does it have a thumbprint scanning capability, or the like), a location of the second client device 105 (e.g., is it located within a branch location for an enterprise corresponding to the synthetic identity detection platform 102, remotely located, or the like), and/or otherwise. In these instances, the second client device 105 may receive identity confirmation information.

Figure 2C:
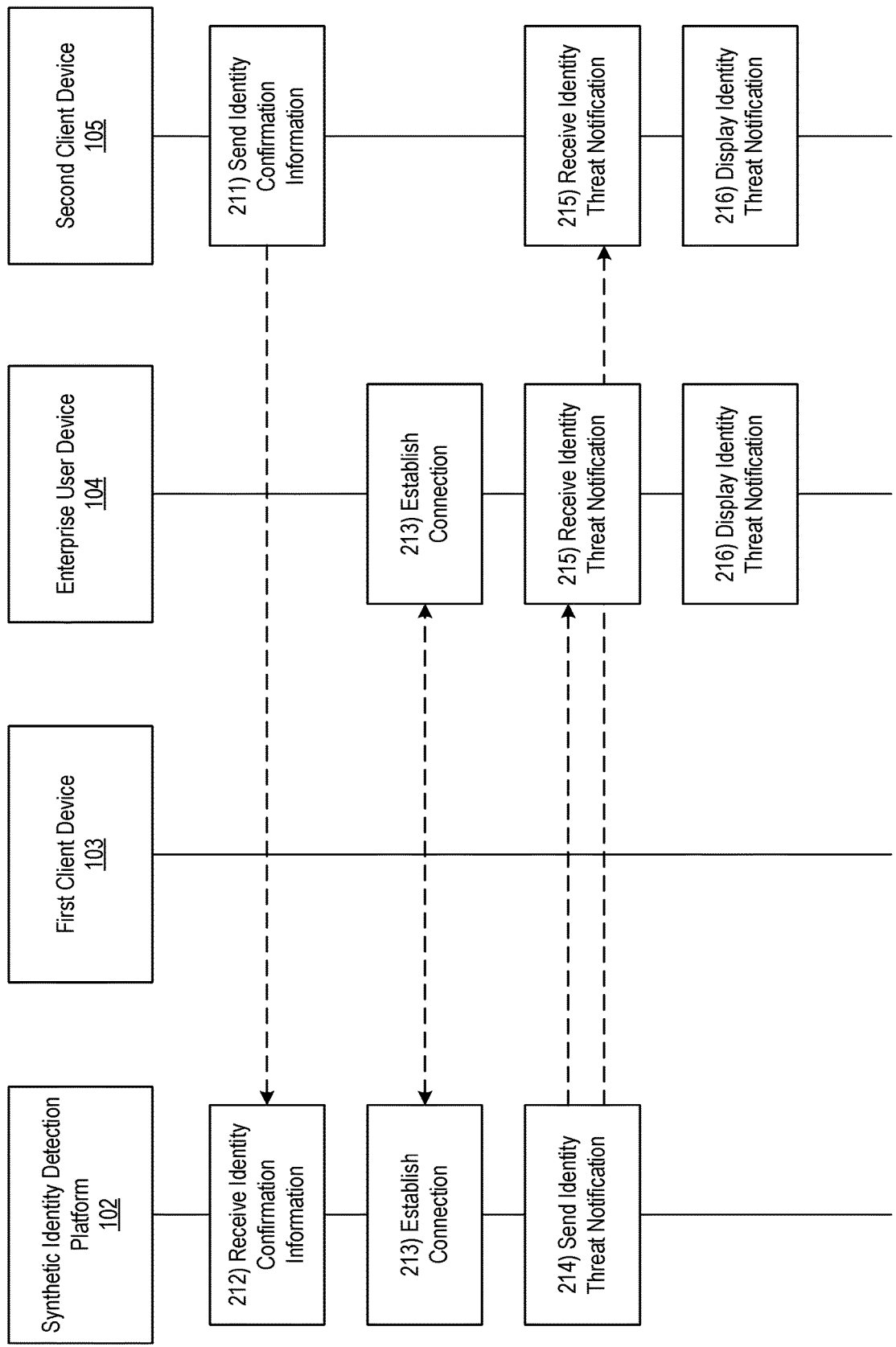

Referring to FIG. 2C, at step 211, the second client device 105 may send the identity confirmation information to the synthetic identity detection platform 102. For example, the second client device 105 may send the identity confirmation information to the synthetic identity detection platform 102 while the second wireless data connection is established.

At step 212, the synthetic identity detection platform 102 may receive the identity confirmation information sent at step 211. For example, the synthetic identity detection platform 102 may receive the identity confirmation information via the communication interface 113 and while the second wireless data connection is established. The synthetic identity detection platform 102 may then return to step 205 to update the synthetic identity score based on the identity confirmation information (which may, e.g., resolve and/or otherwise provide context for data collisions, changing identity information, or the like). In addition or as an alternative to updating the synthetic identity score based on the identity confirmation information received from the second client device 105, the synthetic identity detection platform 102 may automatically obtain additional information (e.g., from third party data sources, social media sources, sources of open sourced data, and/or otherwise) and may use this information to update the synthetic identity score.

At step 213, the synthetic identity detection platform 102 may establish a connection with the enterprise user device 104. For example, the synthetic identity detection platform 102 may establish a third wireless data connection with the enterprise user device 104 to link the synthetic identity detection platform 102 with the enterprise user device 104 (e.g., in preparation for sending identity threat notifications). In some instances, the synthetic identity detection platform 102 may identify whether or not a connection is already established with the enterprise user device 104. If a connection is already established with the enterprise user device 104, the synthetic identity detection platform 102 might not re-establish the connection. If a connection is not yet established with the enterprise user device 104, the synthetic identity detection platform 102 may establish the third wireless data connection as described herein.

At step 214, the synthetic identity detection platform 102 may send an identity threat notification to the enterprise user device 104 and/or second client device 105. For example, the synthetic identity detection platform 102 may send the identity threat notification to the enterprise user device 104 and/or second client device 105 via the communication interface 113 and while the second and/or third wireless data connection are established. In some instances, the synthetic identity detection platform 102 may also send one or more commands directing the enterprise user device 104 and/or second client device 105 to display the identity threat notification.

At step 215, the enterprise user device 104 and/or second client device 105 may receive the identity threat notification. For example, the enterprise user device 104 and/or second client device 105 may receive the identity threat notification while the second and/or third wireless data connection is established. In some instances, the enterprise user device 104 and/or second client device 105 may receive one or more commands directing them to display the identity threat notification.

Figure 5:
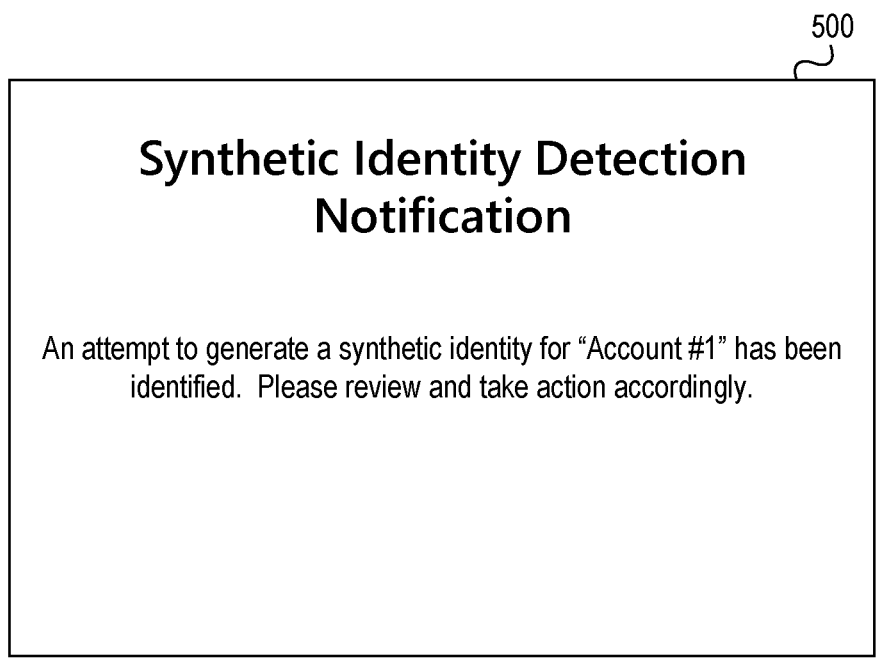

At step 216, the enterprise user device 104 and/or second client device 105 may display the identity threat notification. For example, the enterprise user device 104 and/or second client device 105 may display a graphical user interface similar to graphical user interface 500, which is shown in FIG. 5, and which indicates that a synthetic identity attempt has been detected for a given user. In these instances, the event sequence may proceed to step 218 without executing the requested action at step 217.

In some instances, other security actions may be performed in addition or as an alternative to the sending of the identity threat notification. For example, requests may be blocked entirely, requests may be approved in a limited capacity (e.g., an availability of funds or transaction types available may be limited until a further vetting process has occurred), requests may be escalated for further review, and/or other actions may be performed.

Referring to FIG. 2D, at step 217, the synthetic identity detection platform 102 may execute an action requested along with the identity information provided at step 203. For example, the synthetic identity detection platform 102 may generate an account or profile based on the identity information, issue a financial product based on the information, and/or execute other actions.

At step 218, the synthetic identity detection platform 102 may update the synthetic identity detection model based on the identity information, the synthetic identity detection score, and/or other information. In doing so, the synthetic identity detection platform 102 may continue to refine the synthetic identity detection model using a dynamic feedback loop, which may, e.g., increase the accuracy and effectiveness of the model in identifying synthetic identity generation requests. For example, the synthetic identity detection platform 102 may reinforce, modify, and/or otherwise update the synthetic identity detection model, thus causing the model to continuously improve (e.g., in terms of synthetic identity detection).

In some instances, the synthetic identity detection platform 102 may continuously refine the synthetic identity detection model. In some instances, the synthetic identity detection platform 102 may maintain an accuracy threshold for the synthetic identity detection model, and may pause refinement (through the dynamic feedback loops) of the model if the corresponding accuracy is identified as greater than the corresponding accuracy threshold. Similarly, if the accuracy fails to be equal or less than the given accuracy threshold, the synthetic identity detection platform 102 may resume refinement of the model through the corresponding dynamic feedback loop.

In some instances, a white box model may be used to continuously monitor operations of the synthetic identity detection model in terms of outputs, scores, pattern recognition, why the outputs were generated, and/or other information. In these instances, this information may further be used to refine the synthetic identity detection model.

Figure 3:
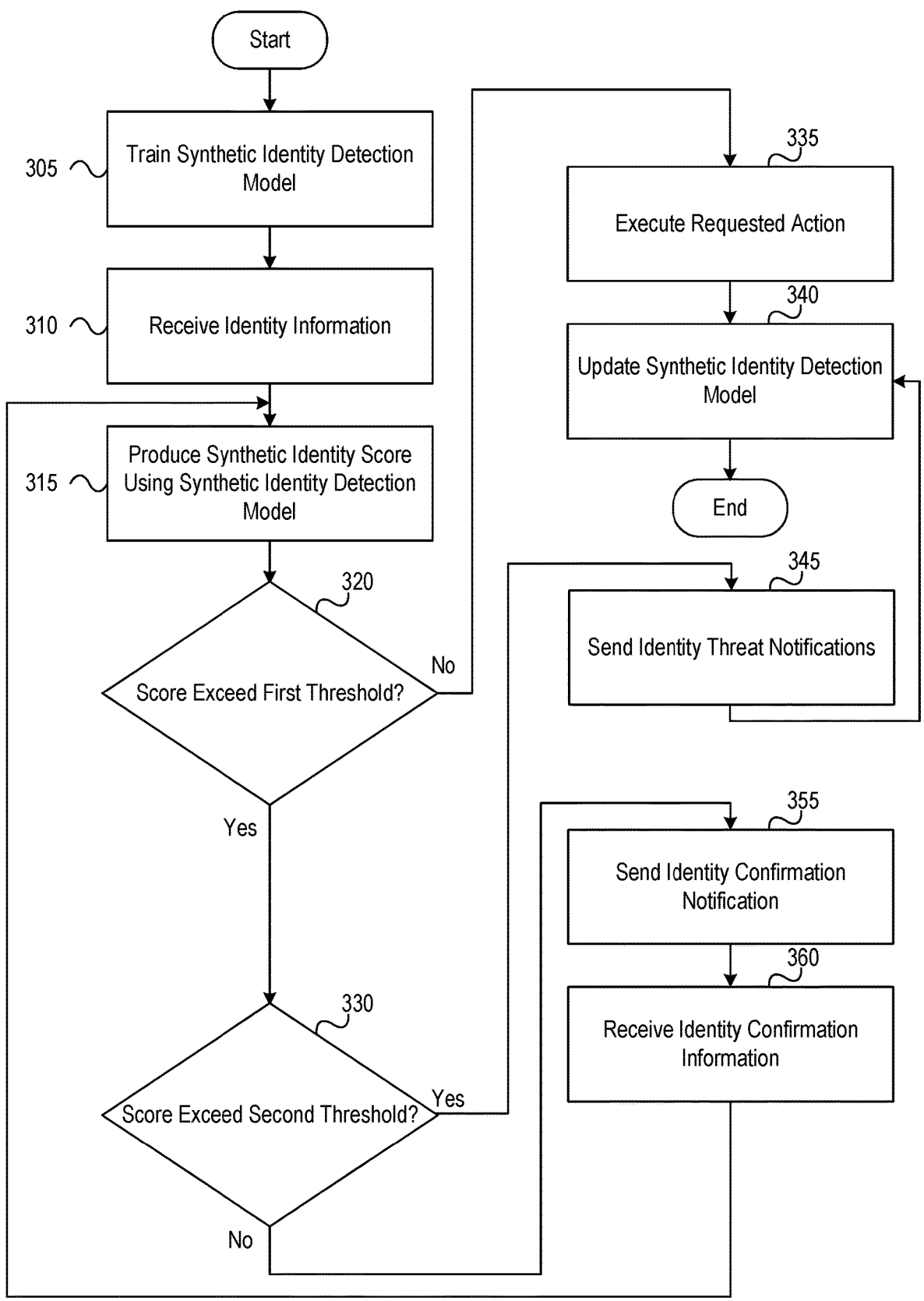
FIG. 3 depicts an illustrative method for using machine learning for collision detection to prevent synthetic identities in accordance with one or more example embodiments.
Figure 4:
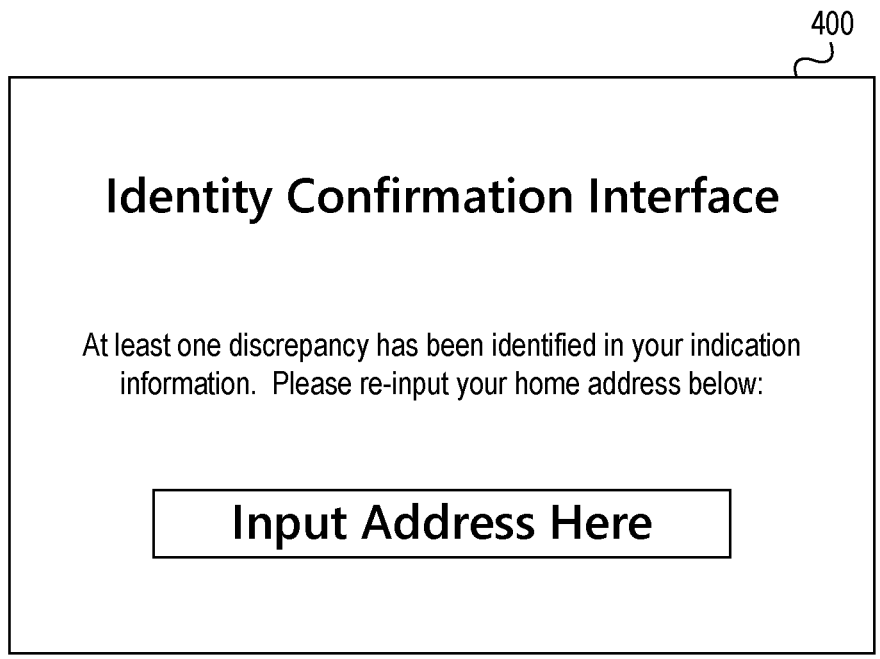
FIGS. 4-5 depict illustrative user interfaces for using machine learning for collision detection to prevent synthetic identities in accordance with one or more example embodiments.

FIG. 3 depicts an illustrative method for using machine learning for collision detection to prevent synthetic identities in accordance with one or more example embodiments. Referring to FIG. 3, at step 305, a computing platform comprising one or more processors, memory, and a communication interface may train a synthetic identity detection model. At step 310, the computing platform may receive identity information. At step 315, the computing platform may produce a synthetic identity score using the synthetic identity detection model and based on the identity information. At step 320, the computing platform may identify whether or not the synthetic identity score exceeds a first threshold. If the synthetic identity score does not exceed the first threshold, the computing platform may proceed to step 335.

At step 335, the computing platform may execute a requested action. At step 340, the computing platform may update the synthetic identity detection model.

Returning to step 320, if the computing platform identifies that the synthetic identity score does exceed the first threshold, the computing platform may proceed to step 330. At step 330, the computing platform may identify whether or not the synthetic identity score exceeds the second threshold. If the synthetic identity score does exceed the second threshold, the computing platform may proceed to step 345. At step 345, the computing platform may send identity threat notifications. The computing platform may then proceed to step 340 to update the synthetic identity detection model as described above.

Returning to step 330, if the synthetic identity score does not exceed the second threshold, the computing platform may proceed to step 355. At step 355, the computing platform may send an identity confirmation notification. At step 360, the computing platform may receive identity confirmation information. The computing platform may then return to step 315.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
train a synthetic identity detection model, wherein training the synthetic identity detection model configures the synthetic identity detection model to detect synthetic identity information;
receive identity information corresponding to an identity generation request;
input, into the synthetic identity detection model, the identity information, wherein inputting the identity information into the synthetic identity detection model causes the synthetic identity detection model to:
identify at least one collision between the received identity information and stored identity information, and
generate, based on the at least one collision, a synthetic identity score indicating a likelihood that the received identity information corresponds to a request to generate a synthetic identity;
compare the synthetic identity score to at least one synthetic identity detection threshold;
based on detecting that the synthetic identity score meets or exceeds a first synthetic identity detection threshold of the at least one synthetic identity detection thresholds, send, to a client device with a known association to a legitimate user corresponding to the identity information, a prompt for identity confirmation information, wherein the identity confirmation information comprises biometric information for the legitimate user;
receive the identity confirmation information;
update, using the synthetic identity detection model and based on the identity confirmation information, the synthetic identity score; and
based on identifying that the synthetic identity score meets or exceeds the at least one synthetic identity detection threshold, execute one or more security actions.

2. The computing platform of claim 1, wherein training the synthetic identity detection model comprises training the synthetic identity detection model to identify a likelihood that a given discrepancy between received and expected identity information corresponds to a synthetic identity generation attempt by generating correlations between historical discrepancies in particular types of identity information and labeling them based on their association with a legitimate or synthetic identity.

3. The computing platform of claim 1, wherein training the synthetic identity detection model comprises applying a higher weight to immutable identity information and a lower weight to mutable identity information.

4. The computing platform of claim 1, wherein the identity information comprises one or more of: address information, biometric information, social security numbers, account information, address information, social media information, or contact information.

5. The computing platform of claim 1, wherein identifying the at least one collision comprises detecting that at least a portion of the identity information is already stored in association with a different identity.

6. The computing platform of claim 5, wherein the different identity comprises one of: a legitimate identity or a synthetic identity.

7. The computing platform of claim 1, wherein the at least one synthetic identity detection threshold is specific to a legitimate user associated with the identity information.

8. The computing platform of claim 1, wherein the memory stores additional computer readable instructions that, when executed by the at least one processor, cause the computing platform to:
based on detecting that the synthetic identity score does not meet or exceed the at least one synthetic identity detection threshold, process the identity generation request.

9. The computing platform of claim 1, wherein the memory stores additional computer readable instructions that, when executed by the at least one processor, cause the computing platform to:
based on detecting that the synthetic identity score meets or exceeds a second synthetic identity detection threshold of the at least one synthetic identity detection thresholds, perform one or more of:
denying the identity generation request, sending synthetic identity notifications to a legitimate user corresponding to the identity information and an administrator corresponding to the computing platform, and
initiating an investigation into the identity generation request and associated identity generation requests.

10. The computing platform of claim 1, wherein the memory stores additional computer readable instructions that, when executed by the at least one processor, cause the computing platform to:
update, based on the identity information, the synthetic identity score, and the synthetic identity detection threshold comparison, the synthetic identity detection model.

11. A method comprising:
at a computing platform comprising at least one processor, a communication interface, and memory:
training a synthetic identity detection model, wherein training the synthetic identity detection model configures the synthetic identity detection model to detect synthetic identity information;
receiving identity information corresponding to an identity generation request
inputting, into the synthetic identity detection model, the identity information, wherein inputting the identity information into the synthetic identity detection model causes the synthetic identity detection model to:
identify at least one collision between the received identity information and stored identity information, and
generate, based on the at least one collision, a synthetic identity score indicating a likelihood that the received identity information corresponds to a request to generate a synthetic identity;
comparing the synthetic identity score to at least one synthetic identity detection threshold;
based on detecting that the synthetic identity score meets or exceeds a first synthetic identity detection threshold of the at least one synthetic identity detection thresholds, sending, to a client device with a known association to a legitimate user corresponding to the identity information, a prompt for identity confirmation information, wherein the identity confirmation information comprises biometric information for the legitimate user;
receiving the identity confirmation information;
updating, using the synthetic identity detection model and based on the identity confirmation information, the synthetic identity score; and
based on identifying that the synthetic identity score meets or exceeds the at least one synthetic identity detection threshold, executing one or more security actions.

12. The method of claim 11, wherein training the synthetic identity detection model comprises training the synthetic identity detection model to identify a likelihood that a given discrepancy between received and expected identity information corresponds to a synthetic identity generation attempt by generating correlations between historical discrepancies in particular types of identity information and labeling them based on their association with a legitimate or synthetic identity.

13. The method of claim 11, wherein training the synthetic identity detection model comprises applying a higher weight to immutable identity information and a lower weight to mutable identity information.

14. The method of claim 11, wherein the identity information comprises one or more of: address information, biometric information, social security numbers, account information, address information, social media information, or contact information.

15. The method of claim 11, wherein identifying the at least one collision comprises detecting that at least a portion of the identity information is already stored in association with a different identity.

16. The method of claim 15, wherein the different identity comprises one of:
a legitimate identity or a synthetic identity.

17. The method of claim 11, wherein the at least one synthetic identity detection threshold is specific to a legitimate user associated with the identity information.

18. One or more non-transitory computer-readable media storing instructions that, when executed by a computing platform comprising at least one processor, a communication interface, and memory, cause the computing platform to:

train a synthetic identity detection model, wherein training the synthetic identity detection model configures the synthetic identity detection model to detect synthetic identity information;
receive identity information corresponding to an identity generation request
input, into the synthetic identity detection model, the identity information, wherein inputting the identity information into the synthetic identity detection model causes the synthetic identity detection model to:
   identify at least one collision between the received identity information and stored identity information, and
   generate, based on the at least one collision, a synthetic identity score indicating a likelihood that the received identity information corresponds to a request to generate a synthetic identity;
compare the synthetic identity score to at least one synthetic identity detection threshold;
based on detecting that the synthetic identity score meets or exceeds a first synthetic identity detection threshold of the at least one synthetic identity detection thresholds, send, to a client device with a known association to a legitimate user corresponding to the identity information, a prompt for identity confirmation information, wherein the identity confirmation information comprises biometric information for the legitimate user;
receive the identity confirmation information;
update, using the synthetic identity detection model and based on the identity confirmation information, the synthetic identity score; and
based on identifying that the synthetic identity score meets or exceeds the at least one synthetic identity detection threshold, execute one or more security actions.

* * * * *